(12) United States Patent
Andou et al.

(10) Patent No.: US 11,671,882 B2
(45) Date of Patent: Jun. 6, 2023

(54) USER EQUIPMENT

(71) Applicant: NTT DOCOMO, INC., Tokyo (JP)

(72) Inventors: Kei Andou, Tokyo (JP); Takao Shimizu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 772 days.

(21) Appl. No.: 16/094,341

(22) PCT Filed: Jan. 26, 2017

(86) PCT No.: PCT/JP2017/002750
§ 371 (c)(1),
(2) Date: Oct. 17, 2018

(87) PCT Pub. No.: WO2017/183245
PCT Pub. Date: Oct. 26, 2017

(65) Prior Publication Data
US 2021/0227430 A1 Jul. 22, 2021

(30) Foreign Application Priority Data
Apr. 21, 2016 (JP) .............................. JP2016-085121

(51) Int. Cl.
*H04W 88/06* (2009.01)
*H04W 36/00* (2009.01)
(Continued)

(52) U.S. Cl.
CPC ...... *H04W 36/0069* (2018.08); *H04B 17/318* (2015.01); *H04B 17/345* (2015.01);
(Continued)

(58) Field of Classification Search
CPC ..... H04W 80/10; H04W 88/06; H04W 16/14; H04W 4/80; H04W 56/001; H04W 72/1215; H04W 76/28; H04W 84/12
(Continued)

(56) References Cited

U.S. PATENT DOCUMENTS 8,599,709 B2 * 12/2013 Chen ................ H04W 28/18
370/252
9,398,482 B2 * 7/2016 Ahn ................ H04W 16/14
(Continued)

FOREIGN PATENT DOCUMENTS

| CN | 102082581 A | 6/2011 |
|---|---|---|
| CN | 102484805 A | 5/2012 |

(Continued)

OTHER PUBLICATIONS

ESTSI TS 136331 V12.6.0 (Jul. 2015) Evolved Universal T Radio Resource control (RRC) Protocol(3GPP TS 36.331 version12.6.0.*
(Continued)

*Primary Examiner* — Joseph Arevalo
(74) *Attorney, Agent, or Firm* — Osha Bergman Watanabe & Burton LLP

(57) ABSTRACT

A technique is provided that is for efficiently avoiding interference that occurs due to simultaneous communication with different radio systems. An aspect of the present invention relates to user equipment including a cellular communication controller that controls first radio communication with a cellular system, and a different radio system communication controller that controls second radio communication with a different radio system other than the cellular system, wherein the cellular communication controller reports, to the cellular system, interference notice indicating interference between the first radio communication and the second radio communication, based on information obtained in the first radio communication.

7 Claims, 6 Drawing Sheets

(51) Int. Cl.
 *H04B 17/318* (2015.01)
 *H04B 17/345* (2015.01)
 *H04W 76/30* (2018.01)
 *H04W 24/10* (2009.01)
 *H04W 52/02* (2009.01)
 *H04W 64/00* (2009.01)

(52) U.S. Cl.
 CPC ....... *H04W 24/10* (2013.01); *H04W 52/0274* (2013.01); *H04W 64/003* (2013.01); *H04W 76/30* (2018.02); *H04W 88/06* (2013.01)

(58) Field of Classification Search
 USPC .... 370/331, 329, 230, 252, 336, 241.1, 254, 370/315, 328, 224, 332; 455/422.1, 458, 455/420, 445
 See application file for complete search history.

(56) References Cited

U.S. PATENT DOCUMENTS

| | | | | |
|---|---|---|---|---|
| 9,439,083 | B2* | 9/2016 | Lee | H04W 36/0055 |
| 9,635,560 | B2* | 4/2017 | Lopes | H04W 72/00 |
| 10,103,756 | B1* | 10/2018 | Peroulas | H04W 24/02 |
| 10,481,273 | B1* | 11/2019 | Ulmer | G01S 19/21 |
| 2010/0329140 | A1* | 12/2010 | Buford | H04M 3/4217 370/252 |
| 2012/0040620 | A1 | 2/2012 | Fu et al. | |
| 2014/0357298 | A1 | 12/2014 | Koskinen et al. | |
| 2016/0088548 | A1* | 3/2016 | Zhao | H04W 48/18 455/422.1 |
| 2016/0095012 | A1* | 3/2016 | Laukkanen | H04W 16/14 370/252 |
| 2016/0345335 | A1* | 11/2016 | Gallien | H04W 52/325 |
| 2017/0280506 | A1* | 9/2017 | Kim | H04W 88/00 |
| 2019/0013883 | A1* | 1/2019 | Tercero Vargas | H04W 72/085 |
| 2020/0178127 | A1* | 6/2020 | Ravichandran | H04W 36/0022 |
| 2021/0058146 | A1* | 2/2021 | Eichen | H04B 7/18513 |

FOREIGN PATENT DOCUMENTS

| | | | |
|---|---|---|---|
| JP | 2015-512182 A | 4/2015 | |
| WO | WO 2017/121460 | * 7/2017 | ............... H04B 7/06 |

OTHER PUBLICATIONS

3GPP TS 36.331 V13.0.0; "3rd Generation Partnership Project; Technical Specification Group Radio Access Network; Evolved Universal Terrestrial Radio Access (E-UTRA); Radio Resouice Control (RRC); Protocol specification (Release 13)"; Dec. 2015 (507 pages).

Ericsson, ST-Ericsson; "Measurements and triggers for IDC indication"; 3GPP TSG-RAN WG2 #77bis Tdoc R2-121645; Jeju, South Korea, Mar. 26-30, 2012 (4 pages).

Huawei, HiSilicon; "Further considerations on IDC indication"; 3GPP TSG-RAN WG2 Meeting #76 R2-115846; San Francisco, USA, Nov. 14-18, 2011 (4 pages).

Written Opinion issued in the International Application No. PCT/JP2017/002750, dated Mar. 21, 2017 (4 pages).

International Search Report issued in the International Application No. PCT/JP2017/002750, dated Mar. 21, 2017 (4 pages).

Office Action issued in Chinese Application No. 201780024324.0; dated May 8, 2021 (20 pages).

* cited by examiner

USER EQUIPMENT

TECHNICAL FIELD

The present invention relates to a radio communication system.

BACKGROUND ART

Typically, a current smart phone or a tablet (hereinafter, collectively referred to as "user equipment (UE)") can perform a communication with radio systems (hereinafter, collectively referred to as "another radio system") other than cellular systems such as a global navigation satellite system (GLASS) and a radio local area network (LAN) in combination with cellular systems such as a long term evolution (LTE) system and a an LTE-advanced system. A cellular chip that controls a radio communication with a cellular system, and another system chip which controls a radio communication with another radio system are mounted in the user equipment. The two chips are configured as independent chips, and the user equipment can simultaneously execute the cellular communication and the other radio communication by using the cellular chip and the other system chip.

When the user equipment transmits a radio signal to a base station (evolved NodeB: eNB) of the cellular system, it is known that inter-modulation distortion (IMD) or harmonic distortion occurs in the user equipment. When the inter-modulation distortion or the harmonic distortion occurs in a reception frequency band of the other radio communication during simultaneous communications with the cellular system and the other radio system, reception sensitivity of the other system chip deteriorates. For example, as illustrated in FIG. 1, when the user equipment executes the cellular communication through two component carriers CC#1 and CC#2 by carrier aggregation (CA), the inter-modulation distortion occurs in the reception frequency band of the other system chip, and reception sensitivity in the other system chip deteriorates.

In a 3rd generation partnership project (3GPP), a signaling by the user equipment, which is referenced as InDeviceCoexIndication, is defined so as to avoid the deterioration of the reception sensitivity in the other radio communication due to the inter-modulation distortion or the harmonic distortion that occurs in the cellular communication. That is, the user equipment transmits the signaling to the base station, and notifies a network of a possibility that transmission to the cellular system may causes interference in the other radio communication. When receiving the signaling, the base station can execute appropriate interference countermeasure processing such as changing of resource block (RB) allocation to the user equipment and release of a secondary cell (Scell) in the carrier aggregation.

PRIOR ART DOCUMENT

Non-Patent Document

Non-Patent Document 1: 3GPP TS 36.331 V.13.0.0

SUMMARY OF THE INVENTION

Problem to be Solved by the Invention

However, a specific trigger condition for making a notification of InDeviceCoexIndication are not defined in specifications. For example, when the user equipment simultaneously communicates with the cellular system and the other radio system, the user equipment may give a notification of the InDeviceCoexIndication. Alternatively, as illustrated in FIG. 2, in a case where the cellular chip monitors a reception state by the other system chip, and the cellular chip determines that reception quality of the other radio system deteriorates due to the cellular communication, the user equipment may give a notification of InDeviceCoexIndication. However, in these cases, even when actually, the communication quality of the other radio communication does not deteriorate due to the cellular communication, there is a possibility that the base station, which receives the signaling, may execute the interference countermeasure processing such as resource block restriction and secondary cell release with respect to the user equipment, and thus an unnecessary decrease in through-put may be caused.

In view of the above-described problem, an object of the invention is to provide a technology of efficiently avoiding interference that occurs due to simultaneous communications with radio systems different from each other.

Means for Solving the Problem

To solve the above-described problem, an aspect of the invention relates to user equipment including a cellular communication controller that controls first radio communication with a cellular system; and a different radio system communication controller that controls second radio communication with a radio system other than the cellular system, wherein the cellular communication controller reports, to the cellular system, interference notice indicating interference between the first radio communication and the second radio communication, based on information obtained in the first radio communication.

Another aspect of the invention relates to a communication method by user equipment communicating with a cellular system and a different radio system other than the cellular system, wherein the method includes obtaining information in first radio communication with the cellular system; and reporting, to the cellular system, interference notice indicating interference between the first radio communication and second radio communication with the different radio system, based on the obtained information.

Advantage of the Invention

According to the invention, interference can be efficiently avoided that occurs due to simultaneous communications with different radio systems.

EMBODIMENTS OF THE INVENTION

Embodiments of the present invention are described below by referring the drawings.

In the following embodiments, a user equipment, which can communicate with a different radio system, is disclosed. In the examples described below, on the basis of information that is acquired in a radio communication with one radio system, the user equipment determines transmission timing of an interference notification that indicates interference between the radio communication and another radio communication with another radio system. Specifically, on the basis of information (positional information, transmission conditions, quality information, a country code, and the like) that is acquired in a cellular communication of an LTE system, an LTE-advanced system, and the like, the user equipment transmits the interference notification to a base station so that inter-modulation distortion or harmonic distortion, which occurs in the cellular communication, does not cause interference in another radio communication with another radio system such as a GNSS system and a radio LAN system. When receiving the interference notification, the base station executes interference countermeasure processing such as resource block restriction and second cell release.

Figure 3:
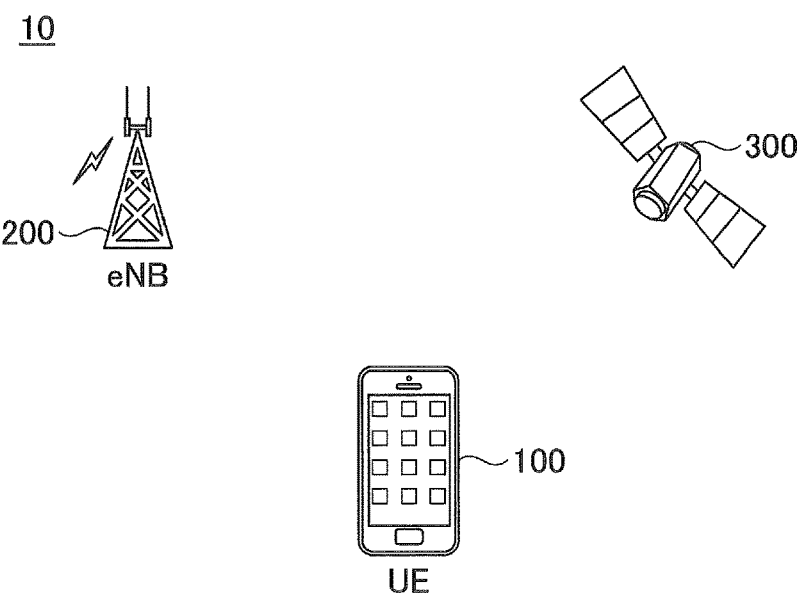
FIG. 3 is a schematic diagram illustrating a radio communication system according to an embodiment of the invention.

First, a radio communication system according to an embodiment of the present invention is described by referring to FIG. 3. FIG. 3 is a schematic diagram illustrating the radio communication system according to the example of the invention.

As illustrated in FIG. 3, a radio communication system 10 includes a user equipment 100, a base station 200, and another radio system 300. Typically, the radio communication system 10 may be a radio communication system based on a standard according to a $3^{rd}$ generation partnership project (3GPP) such as an LTE system, an LTE-advanced system, and a 5G system. However, the radio communication system 10 according to the invention is not limited thereto, and may be, for example, a universal mobile telecommunication system (UMTS) or a UMTS enhancement, or a variation of the LTE system such as an LTE single-cluster, an LTE multi-cluster, a UL inter-band CA, a UL intra-band contiguous CA, a UL intra-band non-contiguous CA, a Dual Connectivity. In addition, in the depicted embodiment, only one base station 200 is illustrated. However, a plurality of the base stations 200 are installed to cover a service area of the radio communication system 10. In addition, only one of the other wireless systems 300 is illustrated. However, it is assumed, typically, that there are two or more types of the other radio communication systems 300, such as a positioning system and a wireless LAN system.

The user equipment (UE) 100 executes a cellular communication with the base station 200 through a cell that is provided by the base station 200, and executes another radio communication with the other radio system 300. Typically, as depicted, the user equipment 100 may be any appropriate information processing apparatus such as a smart phone, a portable telephone, a tablet, a mobile router, and a wearable terminal which are provided with a radio communication function.

Figure 4:
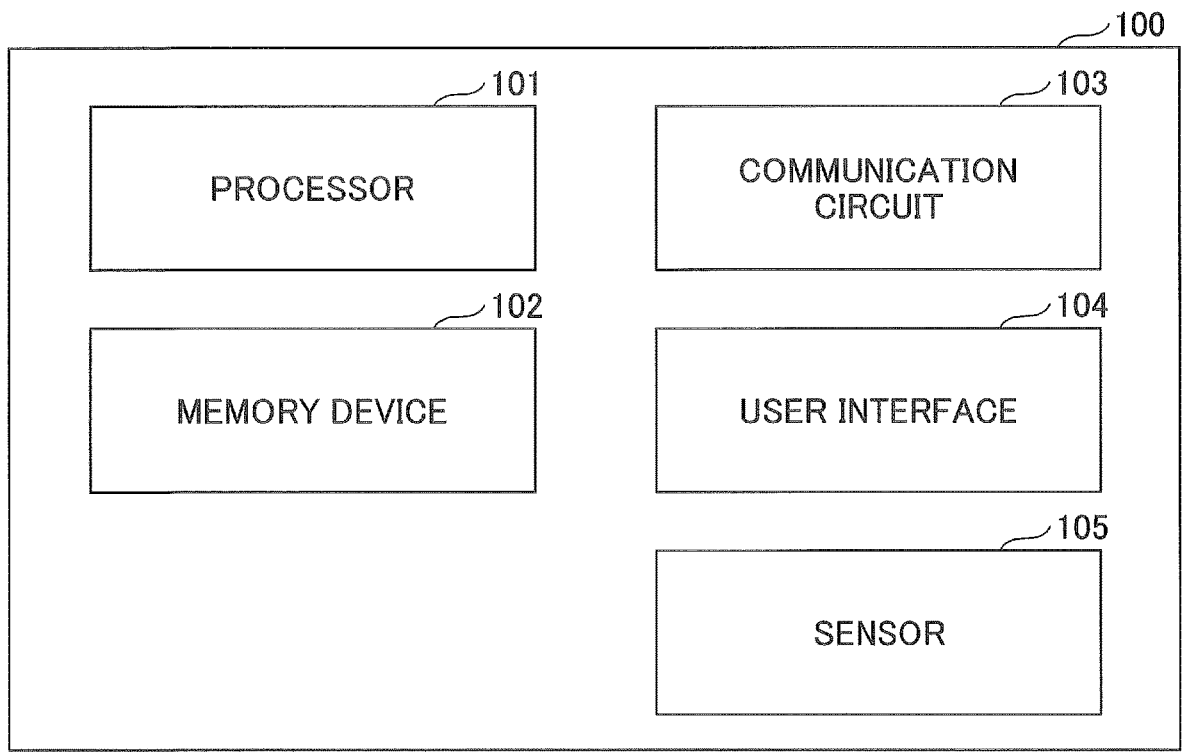
FIG. 4 is a block diagram illustrating a hardware configuration of a user equipment according to an embodiment of the invention.

As illustrated in FIG. 4, the user equipment 100 is formed of hardware resources including a processor 101 that functions as a central processing unit (CPU); a memory device 102 such as a random access memory (RAM) and a flash memory; a communication circuit 103 that transmits and receives a radio signal between the base station 200 and the other radio system 300, a user interface 104 such as an input device and an output device and a peripheral device; a sensor 105 such as a temperature sensor that detects a temperature inside the user equipment 100, etc. For example, each function and each process of the user equipment 100 described below may be implemented by processing or executing, by the processor 101, data and a program stored in the memory device 102. However, the user equipment 100 is not limited to the above-described hardware configuration, and the user equipment 100 may be formed of a circuit, etc., that implements one or more processes described below.

The base station (eNB) 200 transmits a downlink (DL) packet received from a higher layer node or a server that are communicatively connected to a core network (not depicted) to the user equipment 100 by establishing a radio connection with the user equipment 100 through the cell, and the base station (eNB) 200 transmits, to a server, an uplink (UL) packet to a server received from the user equipment 100. In a case where the user equipment 100 supports carrier aggregation, one or more base stations 200 may set two or more cells, that is, a primary cell (Pcell) and a secondary cell (Scell) to the user equipment 100, and may transmit and receive a radio signal to and from the user equipment 100 by simultaneously using the cells.

Figure 5:
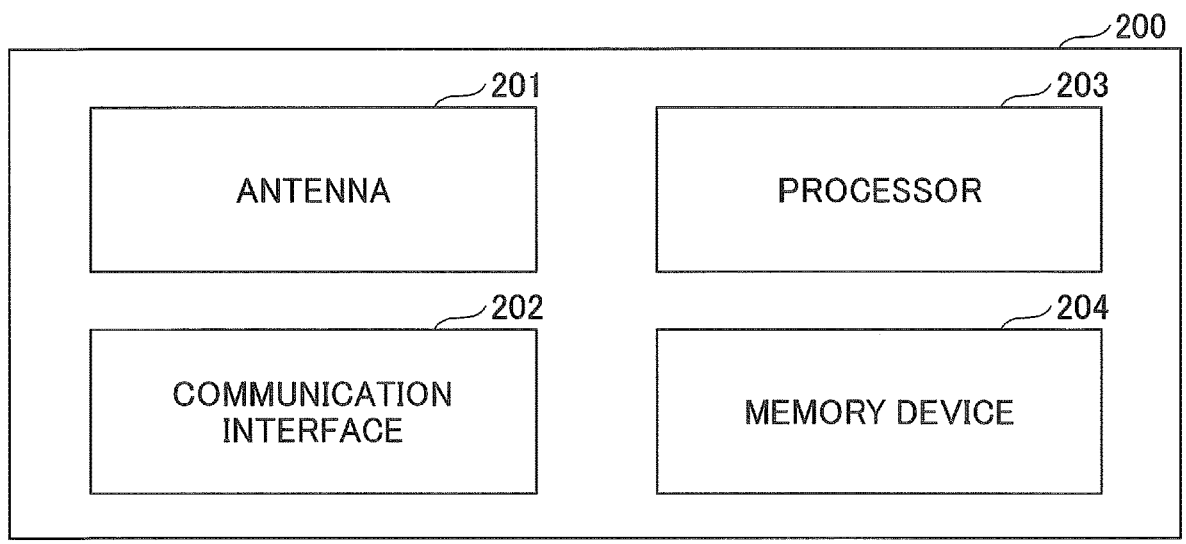
FIG. 5 is a block diagram illustrating a hardware configuration of a base station according to an embodiment of the invention.

As illustrated in FIG. 5, typically, the base station 200 is formed of hardware resources such as an antenna 201 that transmits and receives a radio signal to and from the user equipment 100, a communication interface 202 including an X2 interface to communicate with an adjacent base station 200 and an S1 interface to communicate with the core network (not illustrated), a processor 203 that processes a signal that is transmitted to and received from the user equipment 100, and a memory device 204. Each function and each type of processing of the base station 200 described below may be implemented by processing or executing, by the processor 203, data or a program, which is stored in the memory device 204. However, the base station 200 is not limited to the above-described hardware configuration, and the base station 200 may include any other appropriate hardware configuration.

The other radio system 300 executes a radio communication with the user equipment 100 by transmitting a radio signal to the user equipment 100, and/or by receiving a radio signal from the user equipment 100. The other radio system 300 may be a GNSS system such as a global positioning system (GPS), or a radio LAN system such as a WiFi system without limitation. For example, in a case where the other radio system 300 is the GNSS system, the user equipment 100 receives a radio signal that is transmitted from the GNSS system, and executes positioning processing on the basis of the radio signal that is received. In addition, in a case where the other radio system 300 is the wireless LAN system, the user equipment 100 wirelessly connected to an access point of the wireless LAN system and transmits and receives a radio signal to and from the radio LAN system.

Figure 6:
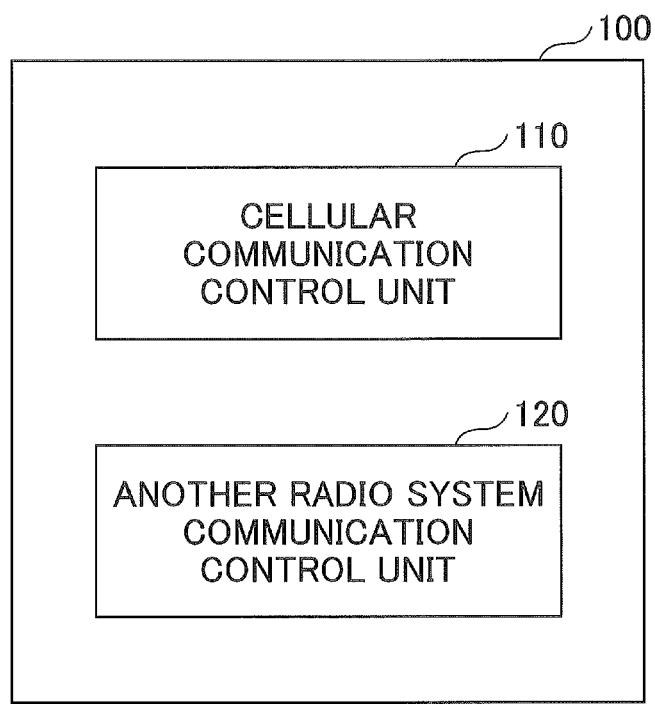
FIG. 6 is a block diagram illustrating a functional configuration of the user equipment according to an embodiment of the invention.

Next, the user equipment according to an embodiment of the invention is described by referring to FIG. 6. FIG. 6 is a block diagram illustrating a functional configuration of the user equipment according to the example of the invention.

As illustrated in FIG. 6, the user equipment 100 includes a cellular communication control unit 110 and another radio system communication control unit 120.

Figure 1:
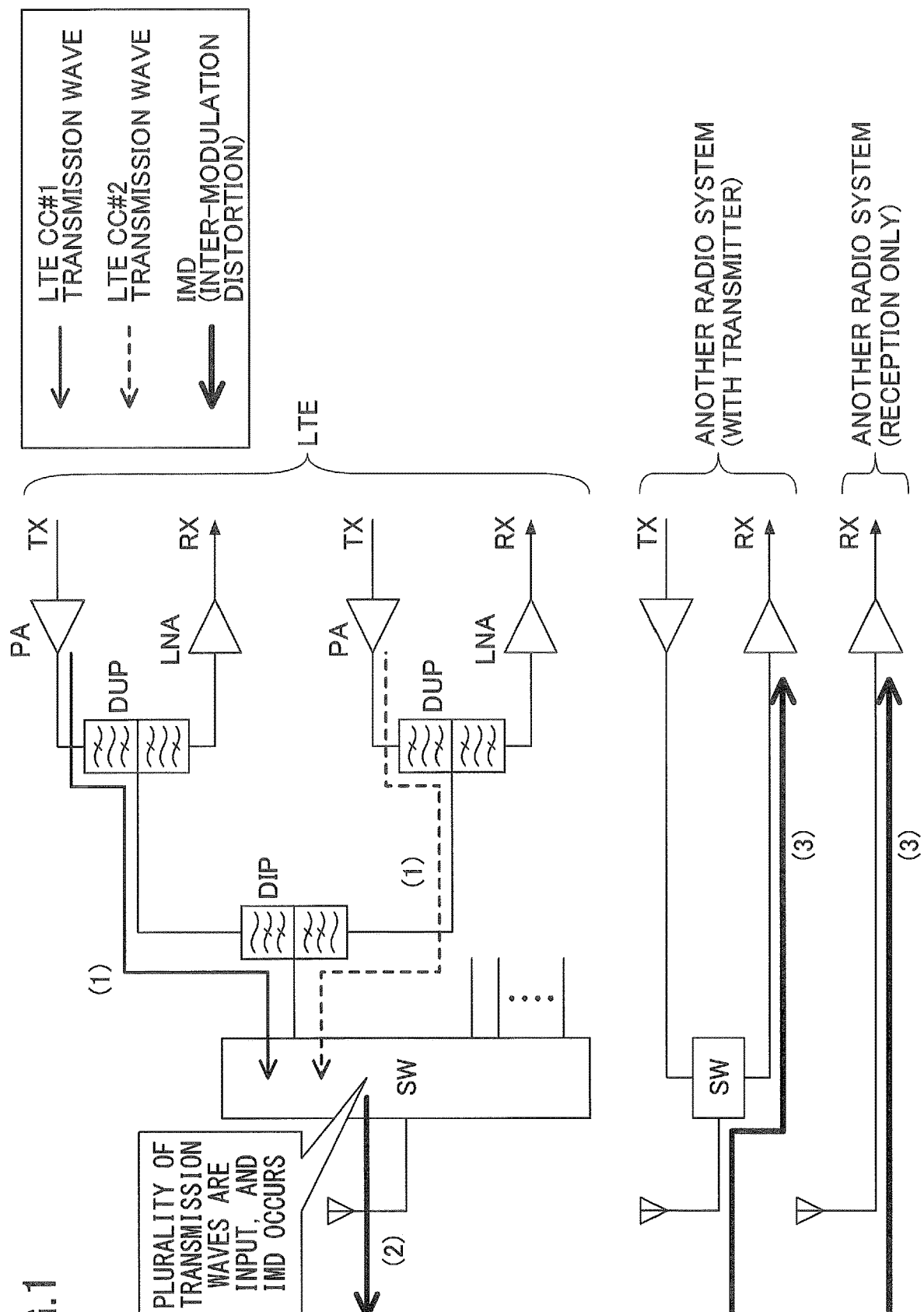
FIG. 1 is a diagram illustrating an example in which IMD due to LTE transmission occurs in a reception band of another radio system.
Figure 2:
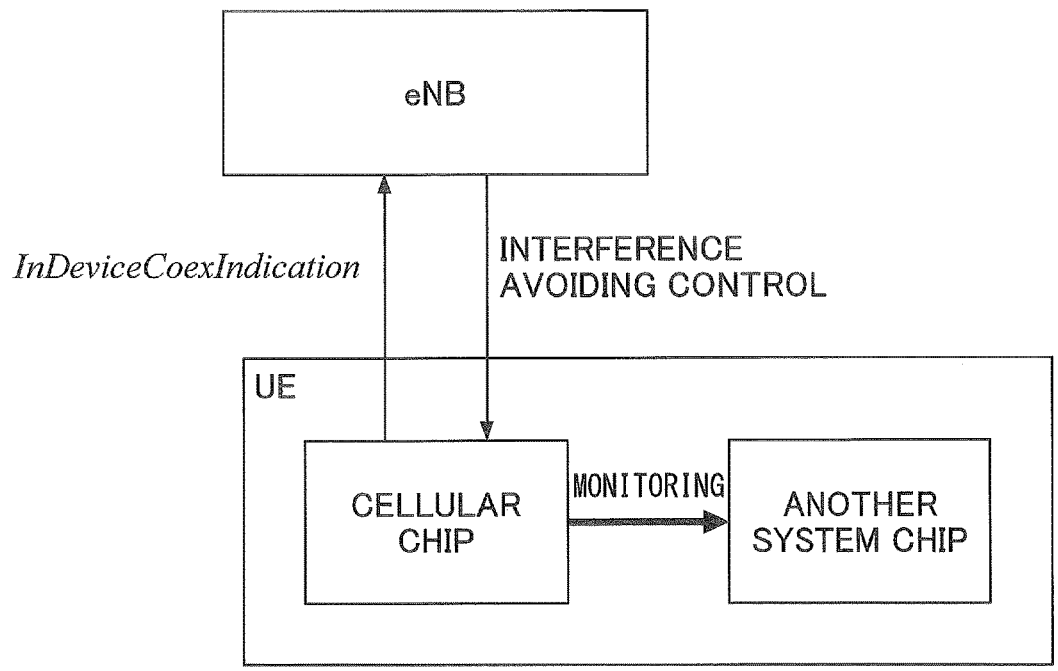
FIG. 2 is a schematic diagram illustrating a method of avoiding inter-device interference in the related art.

The cellular communication control unit 110 controls a radio communication with the base station 200. Specifically, the cellular communication control unit 110 is wirelessly connected to the base station 200, and transmits and receives various radio signals such as an uplink/downlink control channel and an uplink/downlink data channel to and from the base station 200. Typically, it is known that inter-modulation distortion (IMD) or harmonic distortion occurs in the user equipment 100 when the cellular communication control unit 110 executes carrier aggregation by a combination of specific frequency bands. As described above, when the inter-modulation distortion or the harmonic distortion occurs at a reception frequency band of a radio signal that is transmitted from the other radio system 300 to the user equipment 100, interference occurs in another radio communication between the other radio system 300 and the other radio system communication control unit 120, and reception sensitivity by the other radio system communication control unit 120 deteriorates. For example, as illustrated in FIG. 1, when the user equipment executes a cellular communication through two component carriers CC#1 and CC#2 by the carrier aggregation, the inter-modulation distortion occurs at a reception frequency band of another system chip, and the reception sensitivity at the other system chip deteriorates. However, the invention is applicable to any interference that occurs due to a communication with a different radio system without limitation to application with respect to interference due to the inter-modulation distortion or the harmonic distortion in the carrier aggregation.

In addition, the cellular communication control unit 110 notifies the base station 200 of an interference notification that indicates interference between the cellular communication with the base station 200 and the other radio communication with the other radio system 300 on the basis of information that is acquired in the radio communication with the base station 200. When receiving the interference notification, the base station 200 executes appropriate interference countermeasure processing such as reallocation of a resource block and release of the secondary cell during execution of the carrier aggregation. For example, in a case where the cellular system is the LTE system or the LIE-advanced system, the interference notification may be InDeviceCoexIndication. However, the interference notification is not limited, and may be any one notification that indicates interference between a cellular communication with another cellular system such as the UMTS, the UMTS enhancement, and the 5G, and another radio communication by the cellular system and the other radio system 300.

In an embodiment, the information, which is acquired in the cellular communication, may include positional information that is acquired by base station positioning in the cellular communication. Here, the positional information that is acquired by the base station positioning may indicate a position of a serving base station 200, or may indicate a position of the user equipment 100 which is estimated from electric wave intensity from a plurality of adjacent base stations 200. For example, the cellular communication control unit 110 may determine whether or not the user equipment 100 is located at an interference occurrence area on the basis of the positional information that is acquired, and, upon determining that the user equipment 100 is located at the interference occurrence area, the cellular communication control unit 110 may notify the base station 200 of the interference notification. Specifically, the cellular communication control unit 110 retains information relating to the area in which inference with the other radio communication frequently occurs, and determines whether or not the position of the user equipment 100, which is acquired on the basis of the base station positioning, is included in the area. Furthermore, the interference area information may be acquired from the base station 200.

When the acquired position is located in the area, the cellular communication control unit 110 may transmit the interference notification to the base station 200. That is, in a case where the user equipment 100 is located in the frequent inference area, when the other radio communication with the other radio system 300 and the cellular communication are simultaneously executed, the cellular communication control unit 110 determines that a possibility of inference occurrence is high, and transmits the interference notification to the base station 200 to make a request for interference countermeasure processing. When the acquired position is out of the area, the cellular communication control unit 110 does not transmit the interference notification and may continuously execute the cellular communication. That is, when the user equipment 100 is out of the frequent interference area, the cellular communication control unit 110 determines that a possibility of occurrence of interference is low even if the other radio communication with the other radio system 300 and the cellular communication are simultaneously executed, and it is not necessary to make a request for the base station 200 to perform the interference countermeasure processing. According to this, the cellular communication control unit 110 does not transmit the interference notification, and maintains the cellular communication. As a result, the cellular communication control unit 110 can transmit an appropriate transmission timing interference notification to the base station 200 without monitoring a communication status of the other radio communication.

In addition, the cellular communication control unit 110 determines whether the user equipment 100 is located in a positioning disabled area in which positioning by the other radio system 300 is disallowed on the basis of the positional information that is acquired, and, upon determining that the user equipment 100 is located in the positioning disabled area, the cellular communication control unit 110 may switch the other radio system communication control unit 120 into an off-state. For example, when the other radio system 300 is the GNSS system, and when the user equipment 100 is in the positioning disabled area such as an indoor area, the cellular communication control unit 110 may indicate the other radio system communication control unit 120 to stop the other radio communication. As a result, unnecessary execution of the other radio communication can be avoided and battery energy consumption can be reduced when the user equipment 100 is located in the positioning disabled area.

The other radio system communication control unit 120 controls the radio communication between the cellular system and the other radio system 300. For example, the other radio system 300 may be the GNSS system or the radio LAN system without limitation. For example, when the other radio system 300 is the GNSS system, the other radio system communication control unit 120 receives positioning signals from a plurality of GNSS satellites, and performs positioning of the user equipment 100 based on the plurality of positioning signals which are received in accordance with a predetermined positioning algorithm. Alternatively, when the other radio system 300 is the radio LAN system, the other radio system communication control unit 120 is wirelessly connected to an access point, and transmits and receives a radio signal to and from the radio LAN system through the access point.

In addition, the cellular communication control unit 110 and the other radio system communication control unit 120 may establish a communication with each other, and the cellular communication control unit 110 may monitor the other radio communication by the other radio system communication control unit 120. At this time, the cellular communication control unit 110 may monitor communication quality of the other radio communication to acquire quality information such as a quality deterioration amount.

In an embodiment, the information, which is acquired in the cellular communication, may include transmission conditions of the cellular communication with the base station 200, and the cellular communication control unit 110 may control a trigger condition of transmitting an interference notification with respect to quality deterioration of the other radio communication in correspondence with the transmission conditions. The transmission conditions may include the number of transmission resource blocks (RB) in the cellular communication, transmission power, a temperature in the user equipment 100, and the like. In addition, the trigger condition is an index indicating the degree of promotion of the interference notification, and may be the quality deterioration amount of the other radio communication as an example. Namely, in response to detecting that a quality deterioration occurs in the other radio communication that exceeds a quality deterioration amount specified as the trigger condition, the cellular communication control unit 110 may transmit the interference notification to the base station 200. For example, as the number of the transmission resource blocks increases, the quality deterioration amount designated as the trigger condition may decrease. The reason is that, when the number of the transmission resource blocks is large, the cellular communication does not deteriorate to the large extent, even if interference countermeasure processing, such as the resource block restriction and the secondary cell release, is executed. Accordingly, the cellular communication control unit 110 may lower the trigger condition. Namely, the cellular communication control unit 110 may transmit the interference notification to the base station 200, in response to detecting a smaller quality deterioration amount. In contrast, when the number of transmission resource blocks is large, if the interference countermeasure processing is executed, it is considered that the cellular communication significantly deteriorates. Accordingly, the cellular communication control unit 110 may set the trigger condition to be strict. Namely, the cellular communication control unit 110 may transmit the interference notification to the base station 200 only if a greater quality deterioration amount is detected in the other radio communication. From the same viewpoint, as the transmission power increases, the quality deterioration amount designated as the trigger condition may increase. In addition, as the temperature rises, the quality deterioration amount designated as the trigger condition may increase.

In an embodiment, the information obtained in the cellular communication may include communication quality of the cellular communication with the base station 200, and the cellular communication control unit 110 may control, depending on the communication quality, the trigger condition for transmitting the interference notification with respect to the other radio communication. For example, the communication quality may be reference signal received quality (RSRQ) of a cell, reference signal received power (RSRP) of a cell, etc., which are provided by the base station 200. For example, as communication quality of the cell becomes favorable, the quality deterioration amount designated as the trigger condition may decrease. Specifically, when the communication quality is favorable, it is considered that the cellular communication does not deteriorate to a large extend, even if the interference countermeasure processing, such as the resource block restriction and the secondary cell release, is executed. Accordingly, the cellular communication control unit 110 may mitigate the trigger condition, namely, the cellular communication control unit 110 may transmit the interference notification to the base station 200 in response to detecting a smaller quality deterioration amount in the other radio communication. In contrast, when the communication quality is unfavorable, if the interference countermeasure processing is executed, it is considered that the cellular communication further deteriorates. Accordingly, the cellular communication control unit 110 may set the trigger condition to be strict. Namely, the cellular communication control unit 110 may transmit the interference notification to the base station 200 only if a larger quality deterioration amount is detected in the other radio communication.

In an embodiment, the information, which is acquired in the cellular communication, may include a country code of the cellular system, and the cellular communication control unit 110 may control the trigger condition of transmitting the interference notification with respect to the quality deterioration of the other radio communication in correspondence with the country code. For example, during overseas roaming, the user equipment 100 tends to use the GNSS system or the radio LAN system. Accordingly, the interference notification may be set to be more easily transmitted so as to satisfactory use the other radio communication during the overseas roaming. That is, in a case where the country code, which is included in the notification information that is acquired from the base station 200, is a foreign country code, the cellular communication control unit 110 may transmit the interference notification to the base station 200 by mitigating the trigger condition, that is, even when a relatively small quality deterioration amount is detected in the other radio communication. In contrast, in a case where the country code is a domestic country code, the cellular communication control unit 110 may transmit the interference notification to the base station 200 by making the trigger condition strict, that is, only in a case where a relatively great quality deterioration amount is detected in the other radio communication.

Furthermore, the information, which is acquired in the cellular communication, may be a combination of two or greater among the positional information that is acquired by the base station positioning in the cellular communication, the transmission conditions of the cellular communication with the base station 200, the communication quality in the cellular communication with the base station 200, and the country code of the cellular system, or may be another appropriate information.

Figure 7:
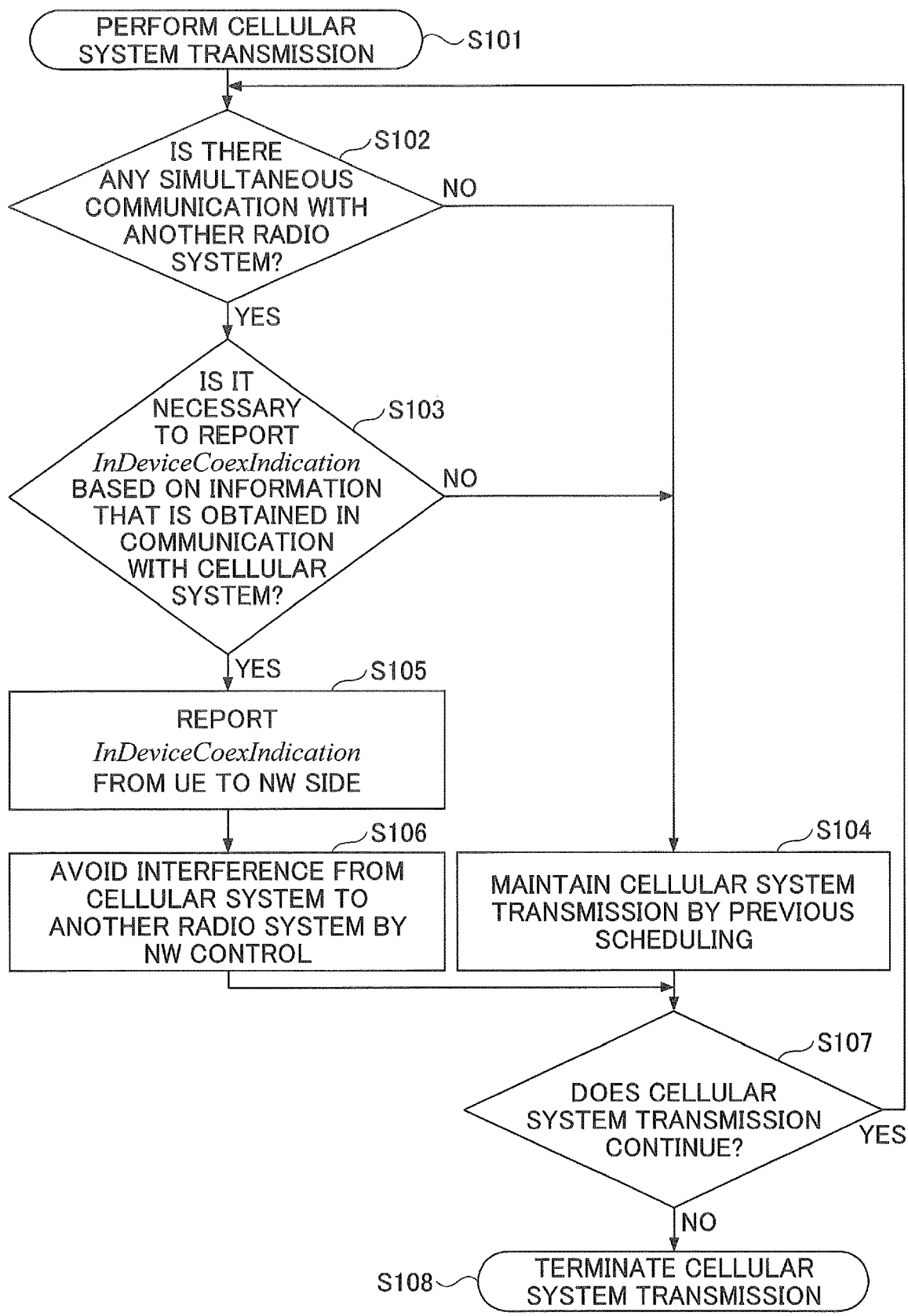
FIG. 7 is a flowchart illustrating processing of controlling radio communication with a cellular system by the user equipment according to an embodiment of the invention.

Next, by referring to FIG. 7, the radio communication control processing by the user equipment according to an embodiment of the invention is described. FIG. 7 is a flowchart illustrating processing of controlling the radio communication with the cellular system by the user equipment according to the example of the invention.

As illustrated in FIG. 7, in step S101, the user equipment 100 executes the cellular communication with the base station 200. At this time, the user equipment 100 may acquire information such as the positional information, the transmission conditions, the quality information, and the country code in the cellular communication.

In step S102, the user equipment 100 determines whether the other radio communication with the other radio system 300 is established. For example, when a user activates a map application, or positional information is requested from an application during activation, the user equipment 100 activates the other radio communication with the GNSS system as the other radio system 300. Alternatively, when the user selects a communication with a WiFi system, the user equipment 100 activates the other radio communication with the WiFi system as the other radio system 300.

In response to detecting the other radio communication (YES in S102), in step S103, the user equipment 100 determines whether it is necessary to transmit the interference notification (InDeviceCoexIndication) to the base station 200 on the basis of the information that is acquired in the cellular communication. For example, the information may be the positional information of the user equipment 100 which is obtained by the base station positioning; the transmission conditions or the communication quality in the cellular communication; the country code of the cellular system; a combination of the two or more information items described above; or any other suitable information. In contrast, in response to detecting no other radio communication (S102: NO), the user equipment 100 continues, in step S104, the cellular communication that is currently executed.

When the user equipment 100 is required to transmit the inference information to the base station 200 (YES in S103), in step S105, the user equipment 100 notifies the base station 200 of the interference information. In contrast, when the user equipment 100 is not required to transmit the interference information to the base station 200 (NO in S103), in step S104, the user equipment 100 continues the cellular communication that is currently executed.

In step S106, the user equipment 100 executes resource block restriction, secondary cell release, etc., in accordance with interference countermeasure processing by the base station 200 that receives the interference information.

In step S107, the user equipment 100 determines whether to continue the cellular communication with the base station 200. If the cellular communication is to be continued, the process returns to step S102. If the cellular communication is not to be continued, in step S108, the cellular communication with the base station 200 is terminated.

The block diagrams used for the descriptions of the above-described embodiment represent blocks on a function-by-function basis. These functional blocks (components) are implemented by any combination of hardware and/or software. Here, a means for implementing each functional block is not particularly limited. Namely, each functional block may be implemented by one device that is physically and/or logically combined, or may be implemented by a plurality of devices that is obtained by directly and/or indirectly (e.g., wired and/or wireless) connecting two or more devices that are physically and/or logically separated.

Figure 8:
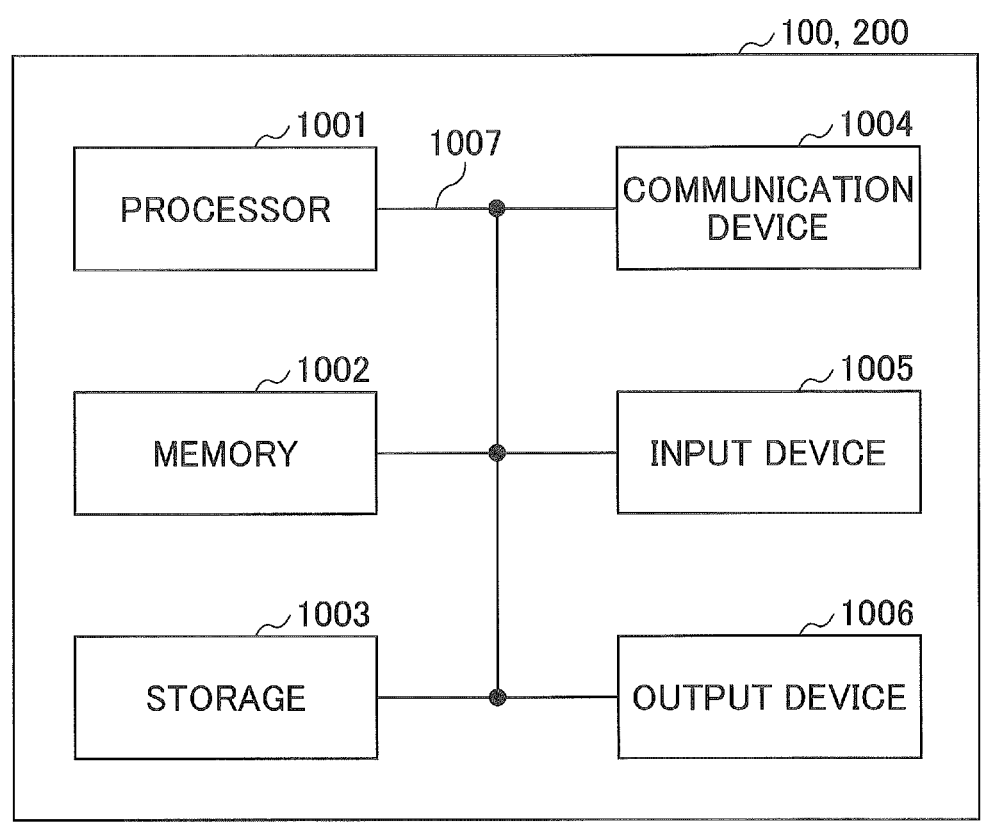
FIG. 8 is a block diagram illustrating a hardware configuration of each of the user equipment and the base station according to an embodiment of the invention.

For example, the user equipment 100 and the base station 200 according to the embodiment of the present invention may function as computers for executing a process of the radio communication method of the present invention. FIG. 8 is a block diagram illustrating a hardware configuration of each of the base user equipment 100 and the base station 200 according to the embodiment of the present invention. Each of the above-described user equipment 100 and base station 200 may be physically configured as a computer device including a processor 1001, a memory 1002, a storage 1003, a communication device 1004, an input device 500, an output device 1006, a bus 1007, etc.

Note that, in the following description, the term "apparatus" can be read as a circuit, a device, a unit, etc. The hardware configuration of each of the user equipment 100 and the base station 200 may be configured to include one or more of the respective devices illustrated, or may be configured not to include a part of the devices.

Each function of the user equipment 100 and the base station 200 is implemented by loading predetermined software (program) on hardware, such as the processor 1001 and the memory 1002, so that the processor 1001 performs computation and controls communication by the communication device 1004, and reading and/or writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, each of the above-described components may be implemented by the processor 1001.

Additionally, the processor 1001 reads a program (program code), a software module and data from the storage 1003 and/or the communication device 1004 to the memory 1002, and executes various processes according to these. As the program, a program is used which causes a computer to execute at least a part of the operations described in the above-described embodiment. For example, a process by each component of each of the user equipment 100 and the base station 200 may be implemented by a control program stored in the memory 1002 and executed by the processor 1001, and another functional block may be similarly implemented. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The memory 1002 is a computer readable recording medium, and the memory 1002 may be formed of at least one of a read-only memory (ROM), an erasable programmable ROM (EPROM), an electrically erasable programmable ROM (EEPROM), a random access memory (RAM), etc. The memory 1002 may be referred to as a register, a cache, a main memory (main storage device), etc. The memory 1002 can store executable programs (program codes), software modules, etc., that can be executed to implement the radio communication method according to the embodiment of the present invention.

The storage 1003 is a computer readable recording medium, and, for example, the storage 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The storage 1003 may be referred to as an auxiliary storage device. The above-described storage medium may be, for example, a database including the memory 1002 and/or the storage 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, each of the above-described component may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different among the devices.

Furthermore, each of the user equipment 100 and the base station 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 101 may be implemented with at least one of these hardware components.

Notification of information is not limited the aspect/embodiment described in the present specification any may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LIE-advanced (LTE-A), SUPER 3G, IMI-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

Processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

The specific operations that are described in the specification to be performed by the base station 200 may be performed by their upper nodes in some cases. In a network formed of one or more network nodes including a base station, it is apparent that the various operations performed for communication with the terminal may be performed by the base station and/or a network node other than the base station (e.g., MME or S-GW can be considered, however, not limited to these). In the above description, a case is exemplified in which there is one network node other than the base station. However, it can be a combination of other network nodes (e.g., MME and S-GW).

Information, etc., may be output from a higher layer (or a lower layer) to a lower layer (a higher layer). Input and output may be performed through a plurality of network nodes.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), and may be made by comparison of numerical values (comparison with a predetermined value, for example).

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the descriptions of the present specification is for the purpose of illustration and does not have any restrictive meaning to the present invention.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, etc., regardless of whether the software is referred to as software, firmware, middleware, microcode, hardware description language or other names.

Furthermore, software, instructions, etc., may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared, radio, and microwave, these wired and/or wireless technologies are included within the definition of the transmission medium.

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

Note that the terms described in this specification and/or the terms necessary for understanding of this specification may be replaced with terms having the same or similar meaning. For example, the channel and/or symbol may be signaling (signal). Furthermore, a signal may be a message. Furthermore, a component carrier (CC) may be referred to as a carrier frequency, a cell, etc.

The terms "system" and "network" as used in this specification are used interchangeably.

Furthermore, the information, parameters, etc., described in this specification may be represented by absolute values, may be represented as relative values from predetermined values, or may be represented by any other corresponding information. For example, the radio resource may be indicated by an index.

The names used for the above-described parameters are not for limiting in any point. Furthermore, mathematical expressions, etc., using these parameters may be different from those explicitly disclosed in this specification. Since the various channels (e.g., PUCCH, PDCCH, etc.) and information elements (e.g., TPC etc.) can be identified by suitable names, the various names assigned to these various channels and information elements are not for limiting in any point.

A base station can accommodate one or more (e.g., three) cells (also referred to as sectors). When the base station accommodates a plurality of cells, the entire coverage area of the base station can be divided into a plurality of smaller areas, and each smaller area may also provide communication services by base station subsystem (e.g., indoor small base station RRH: Remote Radio Head). The term "cell" or "sector" refers to a part or all of the coverage area of a base station and/or base station subsystem that provides communication service in this coverage. Furthermore, the terms "base station," "eNB," "cell," and "sector" may be used interchangeably in this specification. The base station may also be referred to as a fixed station, a NodeB, eNodeB (eNB), an access point, a femtocell, a small cell, etc.

A mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The terms "connected," "coupled," or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. Two elements, when used in this specification, can be considered to be mutually "connected" or "coupled by using one or more wires, cables and/or printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS (Reference Signal), and may be referred to as a pilot (Pilot) according to applicable standards.

The expression "on the basis of" used in the present specification does not mean "on the basis of only" unless otherwise stated particularly. In other words, the expression "on the basis of" means both "on the basis of only" and "on the basis of at least."

Any reference to elements using names, such as "first" and "second," as used in this specification does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

"Means" in the configuration of each of the above-described devices may be replaced with "part," "circuit," "device," etc.

As long as "include," "including," and variations thereof are used in this specification or the claims, the terms are intended to be inclusive in a manner similar to the term "comprising." Furthermore, the term "or" used in the specification or claims is intended not to be an exclusive OR.

A radio frame may be formed of one or more frames in the time domain. In the time domain, each of the one or more of frames may be referred to as a subframe. A subframe may be formed of one or more slots in the time domain. A slot may be formed of one or more symbols (OFDM symbols, SC-FDMA symbols, etc.) in the time domain. Each of the radio frame, subframe, slot, and symbol represents a time unit for transmitting a signal. The radio frame, subframe, slot, and symbol may be called by respective different names. For example, in LTE system, the base station performs scheduling to allocate radio resources (a frequency bandwidth, transmission power, etc., that can be used by each mobile station) to each mobile station. The minimum time unit of scheduling may be referred to as TTI (Transmission Time Interval). For example, one subframe may be referred to as TTI, a plurality of consecutive subframes may be referred to as TTI, or one slot may be referred to as TTI. A resource block (RB) is a resource allocation unit in the time domain and the frequency domain, and may include one or more consecutive subcarriers in the frequency domain. Additionally, the resource block may include one or more symbols in the time domain, and may have a length of one slot, one subframe, or one TTI. Each of one TTI and one subframe may be formed of one or more resource blocks. The above-described configuration of the radio frame is merely an example, and the number of subframes included in the radio frame, the number of slots included in the subframe, the number of symbols and resource blocks included in the slot, and the number of subcarriers included in the resource block can be variously changed.

The embodiments of the invention are described above in detail. However, the invention is not limited to the specific embodiments, and various modifications and changes may be made within a range of the gist of the invention described in the claims.

This application is based upon and claims the benefit of priority of Japanese Patent Application No. 2016-085121 filed on Apr. 21, 2016, and the entire contents of Japanese Patent Application No. 2016-085121 are incorporated herein by reference.

LIST OF REFERENCE SYMBOLS

10: Radio communication system
100: User equipment
110: Cellular communication control unit
120: Another radio system communication control unit
200: Base station
300: Another radio system

The invention claimed is:

1. A terminal comprising:
a cellular communication controller that controls first radio communication with a cellular system; and
a different radio system communication controller that controls second radio communication with a global navigation satellite system (GNSS) other than the cellular system,
wherein the cellular communication controller reports, to the cellular system, interference notice including information indicating interference between the first radio communication and the second radio communication based on information obtained in the first radio communication,
wherein the cellular communication controller includes a cellular chip,
wherein the different radio system communication controller includes a chip of the GNSS,
wherein the cellular chip and the chip of the GNSS are included in the terminal,
wherein, upon detecting that the first radio communication deteriorates reception quality of the GNSS by monitoring the chip of the GNSS by the cellular chip, the cellular communication controller further reports an InDeviceCoexIndication message to the cellular system, and
wherein the InDeviceCoexIndication message is reported with an information indicating a communication technology type.

2. The terminal according to claim 1, wherein the obtained information includes location information obtained by base station positioning in the first radio communication.

3. The terminal according to claim 2,
wherein the cellular communication controller determines whether the terminal is located in an interference occurrence area based on the obtained location information, and
wherein, upon determining that the terminal is located in the interference occurrence area, the cellular communication controller reports the interference notice to the cellular system.

4. The terminal according to claim 1,
wherein the obtained information includes a transmission condition of the first radio communication, and
wherein the cellular communication controller controls a trigger condition for transmitting the interference notice on quality deterioration of the second radio communication, depending on the transmission condition.

5. The terminal according to claim 1,
wherein the obtained information includes communication quality of the first radio communication, and
wherein the cellular communication controller controls a trigger condition for transmitting the interference notice on quality deterioration of the second radio communication, depending on the communication quality.

6. The terminal according to claim 1,
wherein the obtained information includes a country code of the cellular system, and
wherein the cellular communication controller controls a trigger condition for transmitting the interference notice on quality deterioration of the second radio communication, depending on the country code.

7. A communication method by a terminal communicating with a cellular system and a global navigation satellite system (GNSS) other than the cellular system, the method comprising:
obtaining information in first radio communication with the cellular system; and
reporting, to the cellular system, interference notice including information indicating interference between the first radio communication and second radio communication with the GNSS, based on the obtained information,
wherein the terminal includes a cellular chip of the cellular system and a chip of the GNSS,
wherein, upon detecting that the first radio communication deteriorates reception quality of the GNSS by monitoring the chip of the GNSS by the cellular chip, the terminal further reports an InDeviceCoexIndication message to the cellular system, and
wherein the InDeviceCoexIndication message is reported with an information indicating a communication technology type.

* * * * *